(12) United States Patent
Wiercinski et al.

(10) Patent No.: US 6,500,520 B1
(45) Date of Patent: Dec. 31, 2002

(54) PARTICLE COATED BONDING SYSTEMS FOR HYDRATABLE CEMENTITIOUS COMPOSITION CASTING AND METHODS FOR MAKING SAME

(75) Inventors: Robert A. Wiercinski, Lincoln, MA (US); Jyoti Seth, Andover, MA (US); Neal S. Berke, Chelmsford, MA (US); Paul J. Sandberg, Beverly, MA (US)

(73) Assignee: W. R. Grace & Co. -Conn., New York, NY (US)

( * ) Notice: Subject to any disclaimer, the term of this patent is extended or adjusted under 35 U.S.C. 154(b) by 40 days.

(21) Appl. No.: 09/638,331

(22) Filed: Aug. 14, 2000

(51) Int. Cl.$^7$ .............................. D06N 7/04; B32B 7/12; B32B 15/04

(52) U.S. Cl. ...................... 428/150; 428/144; 428/351; 428/354

(58) Field of Search ................................ 428/144, 150, 428/351, 354

(56) References Cited

U.S. PATENT DOCUMENTS

| | | | |
|---|---|---|---|
| 3,741,856 A | 6/1973 | Hurst | 161/88 |
| 3,900,102 A | 8/1975 | Hurst | 206/411 |
| 4,210,457 A * | 7/1980 | Dodson et al. | 106/97 |
| 4,357,377 A | 11/1982 | Yamamoto | 428/40 |
| 4,994,328 A | 2/1991 | Cogliano | 428/489 |
| 5,008,151 A | 4/1991 | Tominaga et al. | 428/343 |
| 5,145,748 A | 9/1992 | Gaidis et al. | 428/489 |
| 5,204,148 A | 4/1993 | Alexander et al. | 428/40 |
| 5,206,068 A | 4/1993 | Kalkanoglu | 428/143 |
| 5,271,781 A | 12/1993 | Anno et al. | 156/71 |
| 5,316,848 A | 5/1994 | Bartlett et al. | 428/351 |
| 5,496,615 A | 3/1996 | Bartlett et al. | 428/144 |
| 5,543,188 A | 8/1996 | Te'eni | 428/36.2 |

FOREIGN PATENT DOCUMENTS

| | | | |
|---|---|---|---|
| GB | 2340070 | 2/2000 | B32B/5/02 |

OTHER PUBLICATIONS

Bituthene Pre-Pour Membrtane: The First Truly Effective Blind Side Waterproofing System. 1993. No Month.
Search Report from PCT/US01/24652 dated Dec. 4, 2001.

* cited by examiner

*Primary Examiner*—Daniel Zirker
*Assistant Examiner*—Victor S Chang
(74) *Attorney, Agent, or Firm*—Craig K. Leon; William L. Baker

(57) ABSTRACT

Coated articles, methods for making such articles, and waterproofing systems incorporating these. An exemplary coated article comprises a body with surface coating of inorganic particles reactive with hydroxide generated from hydration of concrete or mortar to form hydration products. The articles are designed to be used with cast concrete or masonry. The inorganic particles comprise at least one of (a) aluminum oxide trihydrate; (b) silica dioxide; (c) fly ash; (d) blast furnace slag, (e) silica fume; (f) an alkali or alkaline earth metal salts; or mixture thereof. The particles improve bonding with hydratable cementitious compositions that are cast against the coated surface and allowed to set.

20 Claims, 2 Drawing Sheets

PARTICLE COATED BONDING SYSTEMS FOR HYDRATABLE CEMENTITIOUS COMPOSITION CASTING AND METHODS FOR MAKING SAME

FIELD OF THE INVENTION

The present invention relates to articles having pressure-sensitive adhesive surfaces having inorganic particulate coatings for participating in the hydration reaction with hydratable cementitious compositions cast against the coated surfaces and allowed to set.

BACKGROUND OF THE INVENTION

It is known that waterproofing membranes can be provided as pre-formed, sheet-like structures.

For example, U.S. Pat. Nos. 3,741,856 and 3,900,102 of Hurst, incorporated herein by reference, disclosed waterproofing membranes having a carrier support film, and, contiguous thereto, a membrane of a water-proofing pressure-sensitive adhesive. Membrane products of this type can be applied directly onto pre-existing structures, such as concrete foundations or floors. In Hurst '856, it was further disclosed that aggregate materials, such as sand or cork, could be deposited in granular or powdered form on the carrier support film to protect the membrane from damage and/or so that it could provide an improved keying surface for other material, such as concrete, that was subsequently applied thereto. See Col. 4, II. 62–73.

In U.S. Pat. No. 4,994,328 of Cogliano and U.S. Pat. No. 5,316,848 of Bartlett et al., both of which are incorporated herein by reference, waterproofing membranes were disclosed for so-called "blind-side" waterproofing. This referred to a process in which the carrier side of the waterproofing membrane was affixed against a concrete molding form, and fresh concrete was cast against the adhesive layer and allowed to cure. In other words, the waterproofing was installed first in a "backwards" arrangement, and the concrete structure (e.g., foundation, deck, wall, etc.) was installed subsequently by casting it against the outward-facing adhesive side of the waterproofing membrane. In both Cogliano and Bartlett et al., a protective coating was disclosed for protecting the adhesive layer against dirt and damage.

Subsequently, in U.S. Pat. No. 5,496,615 of Bartlett et al., also incorporated herein by reference, it was discovered that a finely divided particulate material could be dusted onto the protective coating, so as to sustain foot traffic on the membrane when it was installed in a horizontal position. At the same time, the finely divided particulate dusted layer permitted fresh concrete to be cast onto the protective coating/adhesive layer to form a fully adhered waterproofing bond with the waterproofing membrane. Bartlett et al. disclosed that the particulates could comprise calcium carbonate, sand, silicate sand, cement, talc, titanium dioxide, carbon black, slate dust, granite dust, and clay.

In U.S. Pat. No. 5,543,188 of Te'eni, incorporated herein by reference, a flexible waterproofing membrane was disclosed having a polymeric sheet with an open surface impregnated with a dry cementitious material defining interconnected internal voids. The dry cementitious material included a water-hardenable cement that was substantially non-hydrated and could be incorporated into the open surface as a slurry or dry powder along with additives such as mineral fillers, silica powder, microsilica, and clay minerals.

The present invention differs from the flexible prior art waterproofing membranes wherein aggregates or filler materials are used as particulate materials to be contained within or coated upon waterproofing adhesive (e.g., Hurst, Cogliano, Bartlett et al.) or cement-binding substrate (e.g., Te'eni).

One of the objectives of the present invention is to employ certain inorganic particulate materials, contained within and/or coated as a discrete separate layer upon a pressure-sensitive adhesive layer or surface, that are operative to react with hydroxide solution from the hydration reaction of concrete or mortar, cast against the particulate-coated adhesive, to form hydration products.

SUMMARY OF THE INVENTION

In contrast to prior art use of particulates comprising aggregates or fillers, the present invention employs particles that react with hydratable cementitious compositions such as concrete or mortar and/or that accelerate the hydration reaction of such compositions. The particles may comprise, for example, set accelerators, strength enhancing agents, pozzolans and/or pozzolanic materials.

An exemplary coated article of the invention comprises a body having at least one surface for carrying particles, the surface comprising a pressure-sensitive waterproofing adhesive or elastomer, and the particles being inorganic particles operative to react with hydroxide (e.g., hydroxides of alkali and/or alkaline earth metal hydroxides, also possibly aluminum hydroxide) solution from the hydration reaction of concrete or mortar to form hydration products, the inorganic particles being selected from set accelerators, strength enhancers, and pozzolans or pozzolanic type materials.

Preferred particles comprise (a) aluminum oxide trihydrate; (b) silica dioxide; (c) fly ash; (d) blast furnace slag, (e) silica fume; (f) an alkali or alkaline earth metal nitrite, nitrate, halide, sulfate, hydroxide, carboxylate, silicate, aluminate a mixture thereof. Aluminum oxide trihydrate particles are most preferred.

A preferred article comprises a waterproofing membrane comprising a waterproofing adhesive membrane layer coated with powdered aluminum oxide trihydrate, silica dioxide, or a mixture thereof, the particles being in the range of 25–1000 microns. Exemplary waterproofing adhesive layers are preferably pressure-sensitive adhesives comprising rubber modified bitumen, natural or synthetic rubber, a synthetic elastomeric material, or a mixture thereof. Preferred is styrene ethylene butadiene styrene.

Most preferred embodiments of the invention are sheet-like, pre-formed waterproofing membranes comprising a pressure-sensitive waterproofing adhesive layer comprising at least 15% and more preferably 40% by weight of SEBS and/or acrylic rubbers, the layer having at least two major faces, at least one of which is coated with particles 50–100 microns in size of aluminum oxide trihydrate, silica dioxide, or mixture thereof, the particles being preferably embedded in the adhesive and partially exposed and thus operative to bind with calcium hydroxide or other alkaline solution from a hydratable cementitious composition that is cast against the particle-coated adhesive layer. Preferably, the waterproofing adhesive layer is attached to a carrier film support layer contiguous with the major face of the adhesive layer opposite the particle-coating layer, and/or a reinforcing mesh or nonwoven layer can be attached to or embedded within the pressure-sensitive adhesive layer.

Articles of the invention may comprise pressure-sensitive adhesive or elastomeric materials formed at a construction site by liquid application.

In addition to sheet-like structures such as waterproofing membranes, further exemplary articles of the invention can include articles having body portions having surfaces (such as waterstops, hoses, panels) or even thermoplastic surfaces (such as hoses, sheets) for carrying the above-described particulate material for bonding with fresh cementitious compositions.

Preferred particulate materials are silicious, aluminous or pozzolanic. For example, silicon dioxide, aluminum trioxide hydrate, silica fume, pumice, crushed firebrick, etc. Pozzolanic materials include siliceous or siliceous and aluminous materials which in themselves possess little or no cementitious value but will, in finely divided form and in the presence of moisture, chemically react with calcium hydroxide at ordinary temperatures to form compounds possessing cementitious properties in that they will fuse in the chemical reaction that occurs upon intermixing of Portland cement and water. Such pozzolanic materials include fly ash, silica fume, ground blast furnace slag, and limestone.

The present invention also provides cementitious articles such as walls, foundations, masonry units (e.g., pavers, bricks, blocks, segmental retaining walls, etc.) bonded to the above-discussed particle-coated articles.

Further advantages and benefits of the invention are disclosed hereinafter.

DETAILED DESCRIPTION OF EXEMPLARY EMBODIMENTS

Figure 1:
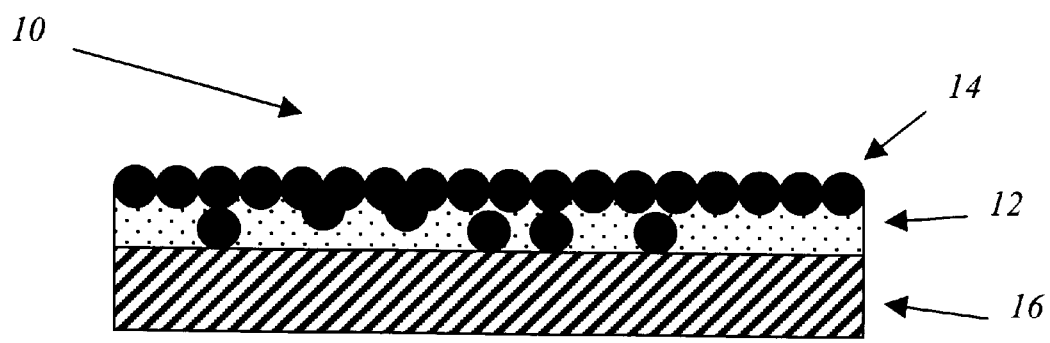
FIG. 1 is a representation of an exemplary waterproofing membrane of the resent invention.
Figure 2:
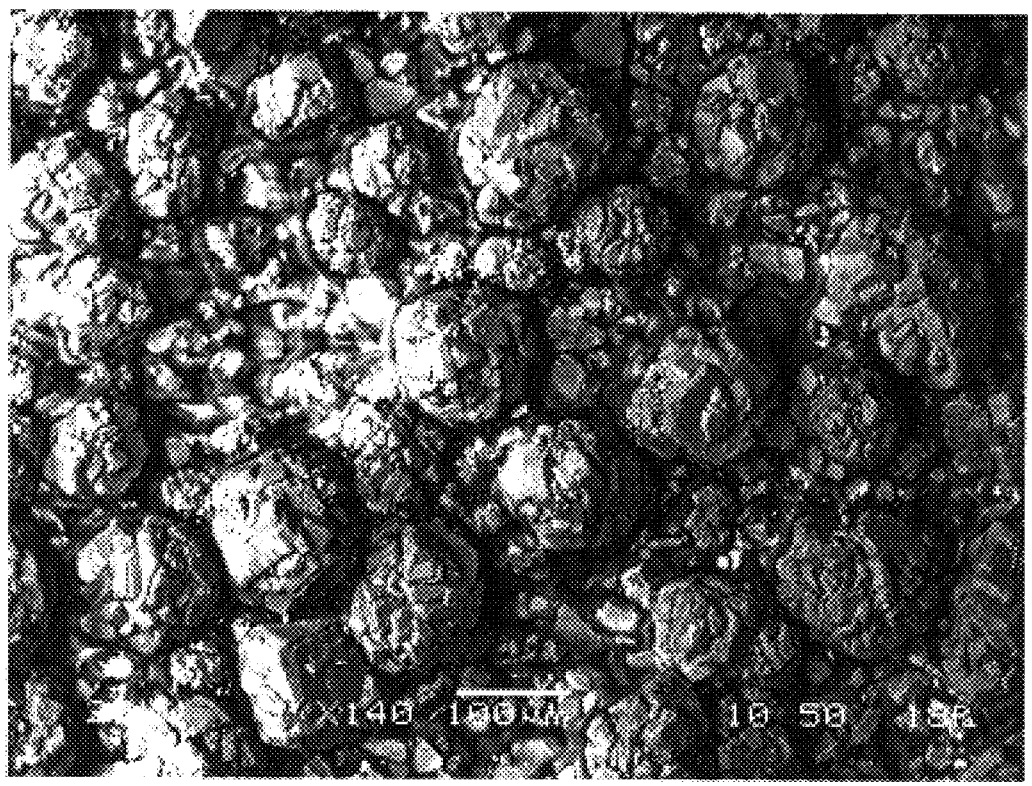
FIG. 2 is a scanning electron microscope photograph (taken at 140×magnification) of the surface of an exemplary particle-embedded (e.g. aluminum oxide trihydrate) surface coating of the present invention.

The pre-applied waterproofing systems described herein, including membranes and coatings, are intended to bond with fresh cementitious compositions that are cast against them and allowed to harden.

The terms "cement" and "cementitious composition" (which may be synonymous with "cement composition") may be used herein to refer to dry powders as well as to pastes, mortars, grouts, and concrete compositions comprising a hydratable cement binder. The terms "paste", "mortar" and "concrete" are terms of art: pastes are mixtures composed of a hydratable cement binder (usually, but not exclusively, Portland cement, masonry cement, or mortar cement. Mortars are pastes additionally including fine aggregate (e.g., sand), and concrete are mortars additionally including coarse aggregate (e.g., crushed gravel, stone). The cementitious compositions tested in this invention may be formed by mixing required amounts of certain materials, e.g., a hydratable cement, water, and fine and/or coarse aggregate, as may be applicable to make the particular cement composition being formed.

The term "pozzolan" or "pozzolanic material" has been used to refer to materials which are not technically cementitious binders such as Portland cement, but which, in the presence of water, may function similarly. A pozzolan has been defined as "siliceous or aluminosiliceous material that possesses little or no cementitious value (i.e. as a binder) but which will, in finely divided form in the presence of water, chemically react with the calcium hydroxide released by the hydration of Portland cement to form materials with cementitious properties." Dodson, V., *Concrete Admixtures* (Van Nostrand Reinhold, N. Y. 1990), page 159. The present invention therefore contemplates the use of pozzolans or pozzolanic materials including diatomaceous earth, limestone, clay (e.g., metakaolin), shale, fly ash, silica fume, and blast furnace slag. Certain ground granulated blast-furnace slags and high calcium fly ashes possess both pozzolanic and cementitious properties. Microsilicas in general can be used for this purpose, although "silica fume" is more preferred since this term is understood to pertain to amorphous spherical particles comprising at least 85% silicon dioxide.

The term "set accelerator" as used herein means and refers to admixtures which, when added to concrete, mortar, or (cement) paste, increase the rate of hydration of hydraulic cement, shorten the time of setting, and increase the rate of early strength development. Dodson, V., *Concrete Admixtures* (Van Nostrand Reinhardt, N.Y. 1990), page 73.

Exemplary "set accelerators" useful as particles in the invention include particles comprising an alkali or alkaline earth metal nitrite or nitrate, halides, sulfates, carboxylates, such as calcium, potassium, sodium salts, or mixture thereof.

Among the most preferred particulate materials for use in the invention, however, are aluminum oxide trihydrate, which are shown at magnification under SEM in FIG. 3 coated on a waterproofing adhesive. The particles are roughly spherical in shape and average about 50 microns in size.

The term "emembedded" as used herein means that particles are attached to, but partially exposed on, the waterproofing adhesive layer or another coating on the waterproofing adhesive layer. The particles may also be "encapsulated," a term meaning that the particles are surrounded by material.

The term "pressure—sensitive adhesive" as used herein refers to a distinct category of adhesives which are aggressive and tacky in dry form at room temperature and which adhere firmly to a variety of dissimilar surfaces. The pressure-sensitive adhesive used in the present invention will have a viscoelastic window of dynamic storage modulus G' and dynamic loss modulus G" between $10^2$ and $10^7$ Pascals.

As shown in FIG. 1, an exemplary waterproofing system 10 of the present invention comprises a pressure-sensitive waterproofing adhesive layer 12 and a discrete, seperate layer of granulated particulate or pozzolanic material 14 that is contiguous with at least one major surface of the adhesive layer 14. The waterproofing adhesive layer 12 may be formed by coating the adhesive onto a substrate surface (not shown) such as a foundation wall, a deck, a below-grade structure, a roof deck, or other building and civil engineering structures. Alternatively, the waterproofing adhesive layer 12 may be provided as a pre-formed layer that is attached to a carrier support sheet 16 (e.g., similar to FIG. 1 but without carrier support layer 16.

Exemplary adhesive layers 14 may comprise rubber modified bitumen or synthetic adhesives, as known in the art, having a thickness of 2–75 mils, and more preferably 5–60 mils. The waterproofing adhesives taught in U.S. Pat. No. 4,994,328 of Cogliano, U.S. Pat. No. 5,316,848 of Bartlett et al., and U.S. Pat. No. 5,496,615 of Bartlett et al. are incorporated herein by reference. In addition to rubber modified bitumen, exemplary waterproofing adhesives include butyl rubber, polyisobutylene, acrylic, vinyl ether, styrene-isoprene-styrene (SIS), styrene-butadiene-styrene (SBS), styrene-ethylene-butylene-styrene (SEBS), ethylene-propylene-diene monomer, and combinations thereof. Preferred waterproofing adhesive layers comprise SEBS, butyl rubber, acrylic rubber, with SEBS being the most preferred because it is hydrogenated and therefore has no or few double bonds.

The waterproofing adhesive layer 12 may further optionally comprise at least one material selected from light absorbers (e.g., titanium dioxide, aluminum oxide), light stabilizers (e.g., hindered amines, benzothiooles), antioxidants (e.g., hindered phenols), fillers (e.g., sand, carbon black, calcium carbonate), plasticizers (e.g., naphthenic, paraffinic, aromatic oils), and rheological additives (e.g., clays, precipitated, fumed silica) in amounts of 0.1 to 5.0 percent based on total weight of the adhesive layer 12. A preferred light absorber is titanium dioxide.

Carrier support sheets 16 may comprise flexible polymer films, meshes (woven), or nonwoven materials having a thickness between 2–60 mils. For flexible sheet-like waterproofing membranes, a cross-laminated high density polyethylene having a thickness of 5–30 mils is preferred.

In addition to waterproofing membranes, exemplary coated articles of the invention may have a body of any desired shape on which a surface is embedded with the bonding particles mentioned above. The body may be formed by coating a construction surface, such as a foundation wall, deck, pipe, tunnel, slab, or other civil engineering structure, with a waterproofing coating (e.g., hot melt), an elastomeric coating (such as commercially sold under the trademark "LIQUID BOOT"), or as an elastomeric material formed from two component liquid-applied waterproofing compositions such as sold by Grace Construction Products, Cambridge, Mass., under the tradename "PROCOR®." The body may also be shaped into a waterstop or expansion joint, which are typically comprised of elastomeric material, having its surface or a portion thereof coated with particles (by coating and embedding during curing) as described above, and most preferably coated with aluminum oxide trihydrate and/or silica dioxide particles.

Most preferred coated articles of the invention comprise a waterproofing adhesive layer comprising SEBS having a thickness of 5–30 mils and comprising a light absorber such as titanium dioxide in an amount of 0 to 10% by weight of adhesive layer, antioxidant like 2,6 ditertiary butyl phenol and UV absorber such as a hindered amine in the amount of 0 to 10% by weight of adhesive layer; said SEBS adhesive layer forming a waterproofing membrane having two opposed edges defining a continuous surface therebetween, and said SEBS adhesive layer being coated on at least one continuous side with particles of aluminum oxide trihydrate having an average particle size of 5 to 100 microns. Preferably, a carrier support film comprising high density polyethylene is attached to the adhesive layer. Methods of the invention therefore include attaching the carrier support sheet of the waterproofing membrane to a form or lagging structure, and casting fresh concrete or mortar against the particle-coated waterproofing adhesive and allowed the concrete or mortar to harden, whereby a fully adhered waterproofing bond is formed between the coated adhesive side and the concrete or mortar.

Optionally, the particles 14 may be attached to the waterproofing adhesive layer 12 using a coating layer which could comprise a water-soluble material (e.g., ethylene vinyl acetate, polyvinyl alcohol), an alkali-soluble material (e.g., latex), or other material through which the particles may diffuse so as to come into contact with a hydraulic cementitious composition that is cast against the waterproofing membrane 10.

Accordingly, the particles may be coated or embedded in the waterproofing adhesive layer if the adhesive comprises material that permits the particles to diffuse through the adhesive material (such as would be the case with water-soluble materials such as EVA, PVOH, EVOH, etc. or alkali soluble materials, e.g., latexes) so as to react with the concrete or mortar cast against the membrane.

Exemplary methods of the invention include providing a body having an elastomeric surface or a pressure-sensitive waterproofing adhesive surface, and embedding a coating of the particles into the surface. For elastomeric materials, this involves embedding the coating layer into the elastomer while it is being cured.

It is claimed:

1. A coated article, comprising: a body having at least one surface upon which is disposed a layer of waterproofing adhesive or elastomer material in a thickness of 2–75 mils, said layer of adhesive or elastomeric material having embedded therein inorganic particles comprising pozzolanic particles selected from the group consisting of fly ash and granulated blast furnace slag; or said inorganic particles comprising set accelerating particles selected from the group consisting of alkali or alkaline earth metal nitrite or nitrate particles or spherical aluminum oxide trihydrate particles.

2. The article of claim 1 wherein said body is in sheet-form operative to waterproof a building or civil engineering surface as a waterproofing membrane, said pressure-sensitive waterproofing adhesive comprising a sheet-body having two opposed edges defining a continuous surface between said two opposed edges.

3. The article of claim 2 wherein said pressure-sensitive adhesive comprises a rubber modified bitumen or a synthetic adhesive.

4. The article of claim 3 wherein said adhesive comprises a synthetic adhesive selected from the group consisting of butyl rubber, polyisobutylene, acrylic, vinyl ether, styrene-isoprene-styrene, styrene-butadiene-styrene, styrene-ethylene-butylene-styrene, styrene-butadiene-styrene, and ethylene-propylene-diene monomer.

5. The article of claim 2 wherein said layer comprises a waterproofing adhesive, and said waterproofing adhesive comprises styrene-ethylene-butylene-styrene.

6. The article of claim 2 wherein said waterproofing adhesive comprises styrene-ethylene-butylene-styrene coated with particles comprising aluminum oxide trihydrate.

7. The article of claim 1 wherein said body comprises a flexible carrier support sheet comprising polyethylene.

8. The article of claim 7 wherein said carrier support sheet comprises a cross-laminated high density polyethylene film.

9. The article of claim 5 wherein said waterproofing adhesive layer is attached to a continuous sheet comprising a material selected from the group consisting of a thermoplastic, rubber, glass and metal material.

10. The article of claim 1 wherein said body comprises an elastomer.

11. The article of claim 10 wherein said body is a waterstop configured for waterproofing an expansion joint.

12. The article of claim 1 wherein said pressure-sensitive adhesive or elastomer is a coating on said body.

13. The article of claim 1 wherein a cementitious composition is cast and hardens against said particles.

14. A method for providing a coated article, comprising: providing a body having at least one surface, coating said at least one surface with a layer of waterproofing adhesive or elastomer, and embedding on said coated layer inorganic particles comprising pozzolanic particles selected from the group consisting of fly ash and granulated blast furnace slag; or said inorganic particles comprising set accelerating particles selected from the group consisting of alkali or alkaline earth metal nitrite or nitrate particles or spherical aluminum oxide trihydrate particles.

15. The method of claim 14 comprising introducing a hydratable cementitious composition against said particle-coated surface.

16. A coated article, comprising: a body having at least one surface upon which is disposed a layer of waterproofing adhesive: or elastomer material in a thickness of 2–75 mils, said layer of adhesive or elastomeric material having embedded therein aluminum oxide trihydrate particles in the average size range of 5–1000 microns.

17. The coated article of claim 16, wherein said article is a carrier sheet, and said aluminum oxide trihydrate particles have an average particle size of 5–100 microns.

18. The coated article of claim 16 wherein said aluminum oxide trihydrate particles have a generally spherical shape.

19. The coated article of claim 16, wherein said article is a carrier sheet, and said adhesive comprises an adhesive selected from the group consisting of butyl rubber, polyisobutylene, acrylic, vinyl ether, styrene-isoprene-styrene, styrene-butadiene-styrene, styrene-ethylene-butylene-styrene, ethylene-propylene-diene monomer, and combinations thereof.

20. The coated article of claim 16 further comprising at least one member selected from the group consisting of a light absorber, light stabilizer, antioxidant, filler, plasticizer, or rheological additive.

* * * * *